United States Patent
Coulmeau et al.

(10) Patent No.: US 9,368,036 B2
(45) Date of Patent: Jun. 14, 2016

(54) METHOD AND DEVICE FOR CALCULATING A FLIGHT PLAN OF AN AIRCRAFT IN A RUNWAY APPROACH PHASE

(71) Applicant: THALES, Neuilly sur Seine (FR)

(72) Inventors: François Coulmeau, Seilh (FR); Jérôme Sacle, Tournefeuille (FR); Emmanuel Dewas, Toulouse (FR)

(73) Assignee: Thales, Courbevoie (FR)

( * ) Notice: Subject to any disclaimer, the term of this patent is extended or adjusted under 35 U.S.C. 154(b) by 25 days.

(21) Appl. No.: 14/316,666

(22) Filed: Jun. 26, 2014

(65) Prior Publication Data

US 2015/0005992 A1    Jan. 1, 2015

(30) Foreign Application Priority Data

Jun. 28, 2013   (FR) ...................................... 13 01521

(51) Int. Cl.
*G08G 5/02* (2006.01)
*G05D 1/06* (2006.01)
*G08G 5/00* (2006.01)

(52) U.S. Cl.
CPC ............... *G08G 5/02* (2013.01); *G05D 1/0676* (2013.01); *G08G 5/0039* (2013.01); *G08G 5/025* (2013.01)

(58) Field of Classification Search
CPC ....... G05D 1/0676; G08G 5/02; G08G 5/025; G08G 5/003; G08G 5/0034; G08G 5/0039; G01C 23/005
See application file for complete search history.

(56) References Cited

U.S. PATENT DOCUMENTS

| | | | |
|---|---|---|---|
| 6,112,141 A * | 8/2000 | Briffe et al. | 701/14 |
| 6,163,744 A | 12/2000 | Onken et al. | |
| 6,658,572 B1 * | 12/2003 | Craig | 726/16 |
| 6,871,124 B1 * | 3/2005 | McElreath | 701/16 |
| 7,499,771 B2 * | 3/2009 | Caillaud | 701/3 |
| 8,234,058 B1 * | 7/2012 | Barber et al. | 701/120 |
| 8,319,667 B2 * | 11/2012 | Burgin et al. | 340/971 |
| 2006/0025899 A1 * | 2/2006 | Peckham et al. | 701/3 |
| 2007/0129855 A1 * | 6/2007 | Coulmeau | 701/3 |
| 2009/0076721 A1 | 3/2009 | Coulmeau et al. | |
| 2010/0152930 A1 * | 6/2010 | Coulmeau et al. | 701/7 |
| 2010/0217510 A1 * | 8/2010 | Deker | 701/120 |

FOREIGN PATENT DOCUMENTS

| | | | |
|---|---|---|---|
| DE | 19604931 A1 | 8/1997 | |
| EP | 2533015 A2 | 12/2012 | |
| FR | 2921153 A1 | 3/2009 | |
| WO | 0241131 A2 | 5/2002 | |
| WO | 2011053805 A1 | 5/2011 | |

* cited by examiner

*Primary Examiner* — Jerrah Edwards
*Assistant Examiner* — Tamara Weber
(74) *Attorney, Agent, or Firm* — Baker & Hostetler LLP

(57) ABSTRACT

A method for calculating a flight plan used by a flight management system of an aircraft in a runway approach phase comprises: loading an initial procedure ending at a first end point not corresponding to a threshold of the runway and a first associated missed approach procedure; determining an additional procedure and a second associated missed approach procedure; concatenating the initial procedure and the additional procedure in order to generate a continuous concatenated flight plan comprising the initial procedure, the first missed approach procedure, the additional procedure and the second missed approach procedure; loading the concatenated flight plan into an active flight plan; selecting a second procedure from a set comprising the first missed approach procedure and the additional procedure; activating the selected second procedure.

13 Claims, 6 Drawing Sheets

METHOD AND DEVICE FOR CALCULATING A FLIGHT PLAN OF AN AIRCRAFT IN A RUNWAY APPROACH PHASE

CROSS-REFERENCE TO RELATED APPLICATION

This application claims priority to foreign French patent application No. FR 1301521, filed on Jun. 28, 2013, the disclosure of which is incorporated by reference in its entirety.

FIELD OF THE INVENTION

The present invention relates to the field of equipment of a Flight Management System, usually referred to as an FMS. More precisely, the present invention relates to a method and a device for calculating a portion of a flight plan used by the FMS when an aircraft is in a runway approach phase, more particularly when the initial approach procedure does not end at the runway but at a certain distance from the latter.

BACKGROUND

When preparing the flight or a diversion, the crew enters its flight plan on a dedicated computer: the FMS (Flight Management System).

FIG. 1 shows the different components of an FMS having functions as listed below and described in the standard ARINC 702 (Advanced Flight Management Computer System, December 1996): they normally provide all or some of the functions of:

- Navigation (LOCNAV), 170, for carrying out the optimum location of the aircraft as a function of geographic location means (GPS, GALILEO, VHF radio beacons, inertial systems);
- Flight plan (FPLN), 110, for entering the geographic elements forming the skeleton of the route to be followed (departure and arrival procedures, waypoints, airways);
- Navigation database (NAVDB), 130, for constructing geographic routes and procedures on the basis of data included in the bases (points, beacons, intercept or altitude legs, etc.);
- Performance database (PRF DB) 150, containing the aerodynamic and engine parameters of the aircraft.
- Lateral trajectory (TRAJ), 120: for constructing a continuous trajectory on the basis of the flight plan, complying with the required navigation performance and confinement constraints of the aircraft (RNP);
- Predictions (PRED), 140: for constructing an optimized vertical profile on the lateral trajectory;
- Guidance (GUID), 200, for guiding the aircraft in the lateral and vertical planes on its 3D trajectory, whilst optimizing the speed;
- Digital data link (DATALINK), 180 for communicating with control centers and other aircraft.

A flight plan is formed of "legs" in the AEEC ARINC 424 format. A leg is constituted of an end (which can be a "waypoint", an end altitude, an intercept with another leg, a beacon radial, a distance with respect to a beacon) and a routing means for arriving at the end.

The lateral trajectory is calculated by the FMS from the flight plan defined by the pilot. On this lateral trajectory, the FMS optimizes (in altitude and speed) a vertical trajectory, complying with possible altitude, speed and time constraints.

A flight plan is generated on the basis of procedures stored in the navigation database 130, structured according to the aforesaid ARINC 424 standard. These procedures are constituted by a set of legs. These digital procedures are the result of data provided by states, corresponding to the points and procedures in force in the airspace flown through.

For example, in order to construct a flight plan, the pilot chooses different procedures indexed by a name. The FMS then extracts these procedures from the database and then carries out a chaining of the successive procedures in order to generate the flight plan.

A flight plan can be used by the FMS for calculating trajectories and predictions and for slaving the aircraft. There are several flight plans managed by the FMS. The active flight plan is the flight plan on which the FMS is capable of guiding the aircraft when it is coupled to the automatic pilot. The actual slaving of the aircraft to the active flight plan is obtained by coupling with the automatic pilot. The temporary flight plan is a working copy coming from the active flight plan and replaces the latter when it is activated. There is also a secondary flight plan.

All of the information entered or calculated by the FMS is grouped on display screens such as textual displays, displays called ND (Navigation Display). An example of an ND navigation display is shown in FIG. 2.

On the screen, the aircraft 20 is shown on its lateral trajectory 21 comprising waypoints WPT. The aircraft is situated on a so-called active segment comprising the waypoint GULEN 22 that the aircraft has just passed (called "FROM") and the next waypoint TOU 23 towards which it is flying (called "TO").

With regard to the takeoff and landing phases, air traffic management in general and the regulations relating to safety have for a very long time required state organizations and airport authorities to publish takeoff or landing procedures for flights leaving or arriving at aerodromes. These procedures, graphical and textual, have existed for a long time in paper form only. With the arrival of flight management systems the necessity arose to manage electronically all of the takeoff or landing published by the states.

Thus, at present the textual and graphical procedures are provided by the member states of International Civil Aviation Organization to the suppliers of navigation databases and are converted by theses suppliers into series of legs according to the codification rules of the aforesaid ARINC standard. The takeoff and landing procedures, the latter being called approach procedures, encoded in the ARINC 424 standard, are stored in the database 130 and are used by the FMS during a runway approach phase.

When an aircraft is approaching a runway, it frequently happens that the initial encoded approach procedure of the airport in question ends at a point that does not coincide with the runway entry point Pa.

In general, an encoded approach procedure stored in the navigation database 130 ends at an end point (the last point of the approach) of the MAP (Missed Approach Point) type. An end point of the MAP type is characterized by the fact that it is linked with a "Missed Approach" procedure, also stored in the database 130. The missed approach (or go-around) procedure is used with the situation of the aircraft does not allow it to land as initially foreseen. The approach procedure ending in a point of the MAP type and its associated missed approach procedure MA1 are loaded in the flight plan de the aircraft.

The active flight plan contains only the procedure up to the MAP and therefore only the FMS trajectory coming from that flight plan. On sequencing (overflying) this MAP, the "Missed Approach" flight section is automatically activated in order to allow, if needed, the aircraft to be guided over the missed approach procedure.

A major disadvantage is that, when the end point of the MAP type does not correspond with the runway threshold, the crew has to manage the end of the approach manually in order to join the runway from the end point. It is therefore a critical phase for the crew.

In daytime, the final approach can be carried out visually, on the basis of a published map such as the one shown in FIG. 3.

The point 30 of the MAP type corresponds to the end of the encoded approach procedure loaded in the FMS. The curve in dotted line MA1 corresponds to the missed approach procedure MA1 associated with the approach procedure ending at the point 30.

The curve shown in arrows 31 corresponds to the visual approach procedure that the pilot has to follow manually until reaching the threshold Pa of the runway P. The threshold Pa of the runway is also a point of the MAP type. The curve MA2 shown in dotted line corresponds to the missed approach procedure (or go-around procedure) associated with the visual approach procedure leading to the point Pa.

The problem to be solved is management of these two sections.

At night or in the case of fog, the approach can be carried out with instruments as far as the MAP 30 using a published map such as the one shown in FIG. 4. Starting from the MAP 30, the aircraft can be guided by a radio approach beacon (such as for example in the prior art by an ILS (Instrument Landing System)), possibly managed by the control radar of the airport for the alignment with the runway axis.

It is possible for air companies to add proprietary data in the navigation database 130.

For example, when the initial approach procedure does not end at the runway threshold, some companies, in order to assist their crews, complete the trajectory between the first point and the runway P by encoding a section in the database 130. This encoding is of course carried out on a case by case basis, with the agreement of the air control authorities for the approach to the airport in question.

Thus, additional approach procedures are generated by the air companies and stored in the navigation database 130. The additional procedures have a first point that does or does not coincide with the end point of the MAP type of the initial approach procedure and a last point equal to the runway threshold Pa. The point Pa is linked to a missed approach procedure MA2, also encoded by the company, for the case in which the aircraft finds itself in a situation where it is obliged to go around rather than to land.

The initial approach procedure ending at the MAP is loaded in the flight plan. A major disadvantage is that the present-day systems do not make it possible to have a continuity of the flight plan (and therefore of the reference trajectory) allowing the aircraft to be guided continuously according to the initial approach procedure ending at the MAP (which is not the threshold of the runway) and then according to the additional company procedure up to the runway.

In fact, present-day implementations do not make it possible to have 2 points of the MAP type in the same flight plan: the first MAP point is on the one hand the end of the activated part of the primary flight plan (initial approach procedure) and the start of the associated "Missed Approach" part MA1. It is necessarily unique since, in the prior art, only one single part of the "Missed Approach" type can exist in a portion of flight plan. Thus, in the implementations according to the prior art, the loading of the additional procedure and the associated "Missed Approach" MA2 causes the erasure (by replacement) of the initially entered procedure.

The present-day implementations do not make it possible to link divergent parts of flight plan. However, there is divergence from the initial approach at the point MAP since the flight plan can be followed either towards the additional procedure or towards the "Missed Approach" part MA1 of the initial procedure.

In order to partially overcome this disadvantage, when the initial approach procedure is loaded in an activated primary flight plan, it is possible to load the additional company procedure in another flight plan, for example the secondary flight plan. When the two flight plans, primary and secondary, can be displayed simultaneously, the pilot can then end his approach manually using the secondary flight plan starting from the point MAP of the initial approach. However, there are rules which prohibit the activation of the secondary flight plan. This activation necessitates a series of complex operations by the pilot during the critical phase of the landing, which cannot be done in practice.

Thus, there is no guidance by the FMS in this case, either laterally or vertically, since the activated primary flight plan is no longer being followed.

Moreover, if an event makes it necessary to activate the missed approach procedure and the aircraft has already flown over the MAP of the initial procedure, it is the missed approach procedure MA1 associated with the initial approach that would be activated and not the one corresponding to the additional procedure which is not integrated in the active flight plan.

SUMMARY OF THE INVENTION

A purpose of the invention is to overcome the aforesaid disadvantages by proposing a method allowing the pilot to carry out the runway approach phase using a single and continuous flight plan which can be coupled to the automatic pilot at any time for guiding the aircraft.

The present invention relates to a method for calculating a flight plan used by a flight management system (FMS) of an aircraft in a runway approach phase, the said flight management system (FMS) comprising a navigation database comprising at least one stored additional procedure ending at the threshold of the runway and at least one associated additional missed approach procedure, the said method comprising the steps consisting of:
  loading an initial procedure ending at a first end point not corresponding to a threshold of the runway and a first associated missed approach procedure,
  determining an additional procedure from among the at least one additional procedure stored in the navigation database and a second associated missed approach procedure,
  concatenating the initial procedure and the additional procedure in order to generate a continuous concatenated flight plan comprising the initial procedure, the first missed approach procedure, the additional procedure and the second missed approach procedure,
  loading the concatenated flight plan into an active flight plan,
  selecting a second procedure from a set comprising the first missed approach procedure and the additional procedure,
  activating the selected second procedure (P2).

According to one embodiment, the step of determining an additional procedure is operated manually by the pilot using a man-machine interface.

According to another embodiment, the step of determining an additional procedure is operated automatically by the flight management system according to at least a first predetermined criterion.

Advantageously, the first criterion is chosen from a set comprising the shortest distance to the runway and an indexing of preference.

According to a variant, the first end point of the initial procedure (P1) is provided with a first identifier, the additional procedure comprises a sequenced series of waypoints each having an identifier, and the concatenation step comprises the sub-steps consisting of:
  running through the waypoints and comparing the indicator of the current waypoint with the first identifier,
  when a waypoint having an indicator identical to the first identifier is identified:
    comparing the geographic coordinates of the identified waypoint with the geographic coordinates of the first end point,
    when the coordinates are identical, concatenating the initial procedure with the additional procedure from a start point corresponding to the identified waypoint of the sequenced series,
    eliminating the waypoints situated upstream of the identified waypoint in the sequenced series,
  when no waypoint comprising an indicator identical to the first indicator is identified:
    concatenating the additional procedure with the initial procedure starting from a start point corresponding to the first waypoint of the sequenced series, by inserting a lateral discontinuity between the first end point and the first point of the sequenced series.

According to one embodiment the selection step is operated manually by a pilot using a man-machine interface.

According to anther embodiment the selection step is operated automatically by the flight management system according to at least one second predetermined criterion that is a function of parameters representative of the aerodynamic situation of the aircraft.

Advantageously the parameters are chosen from a set comprising: current heading; target heading; lateral deviation with respect to the active flight plan; altitude; energy; current position; predicted position.

Advantageously the method according to the invention furthermore comprises a step consisting of eliminating the second non-selected procedure.

Advantageously the method according to the invention furthermore comprises a step consisting of graphically displaying the initial procedure, the associated missed approach procedure, the additional procedure and the associated additional missed approach procedure on a common display.

Advantageously the display shows a differentiation between activated and non-activated procedures.

BRIEF DESCRIPTION OF THE DRAWINGS

Other features, purposes and advantages of the present invention will become apparent on reading the following detailed description referring to the appended drawings, given as non-limiting examples, and in which.

DETAILED DESCRIPTION

Figure 1:
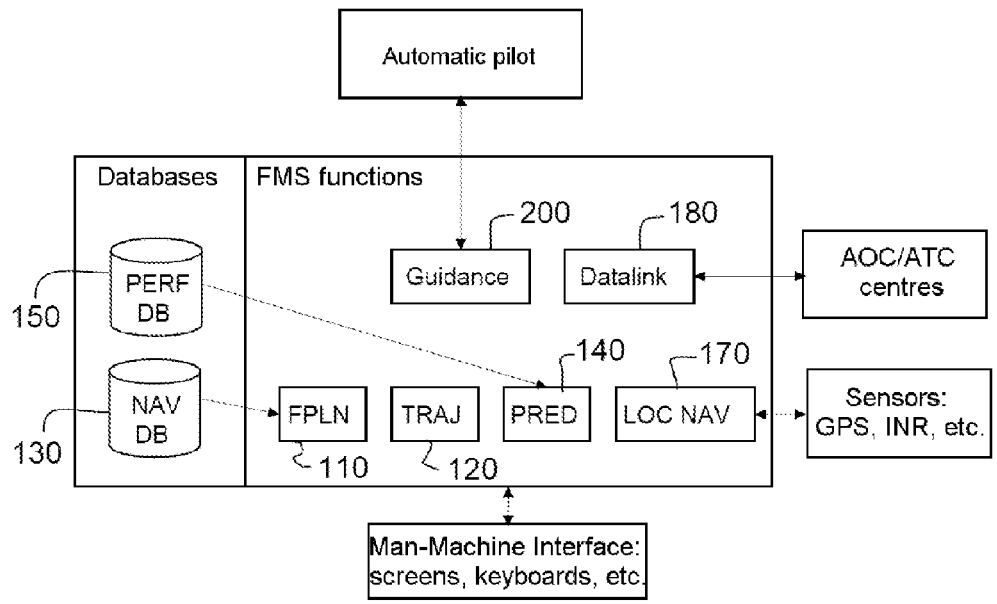
FIG. 1, already referred to, shows the different components of a flight management system according to the prior art.
Figure 2:
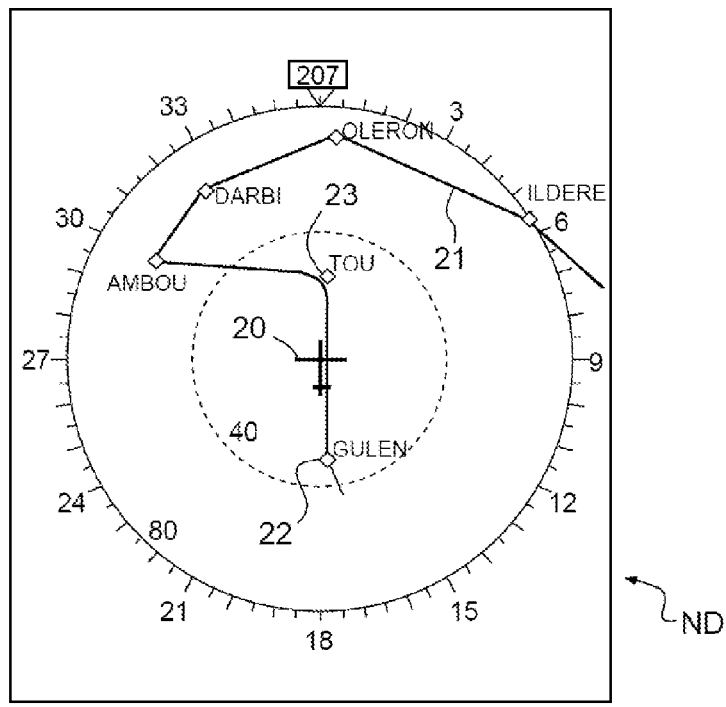
FIG. 2, already referred to, shows an example of a navigation screen according to the prior art.
Figure 3:
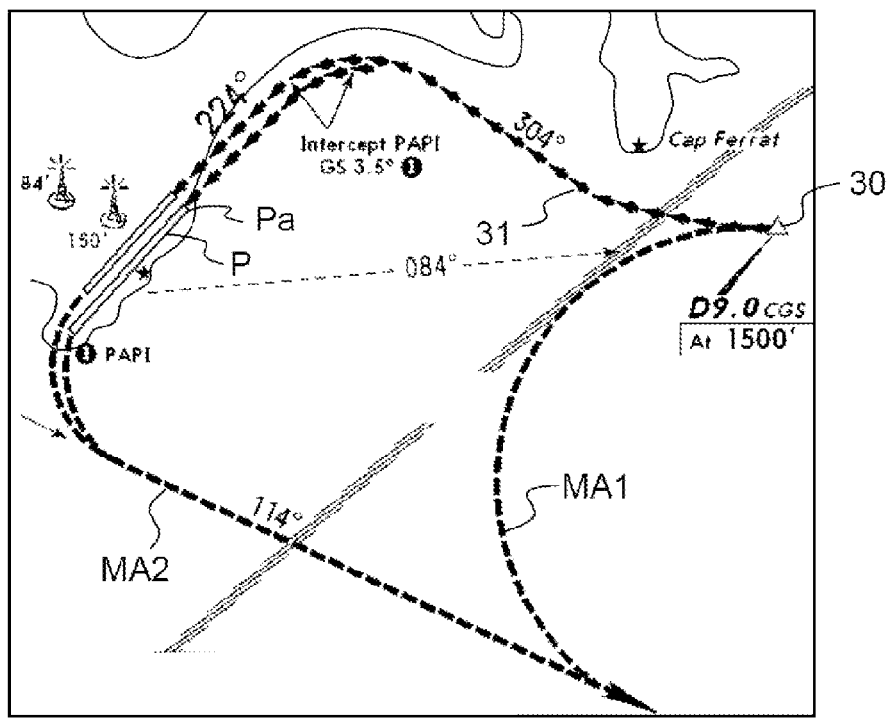
FIG. 3, already referred to, shows a map published for a visual approach procedure.
Figure 4:
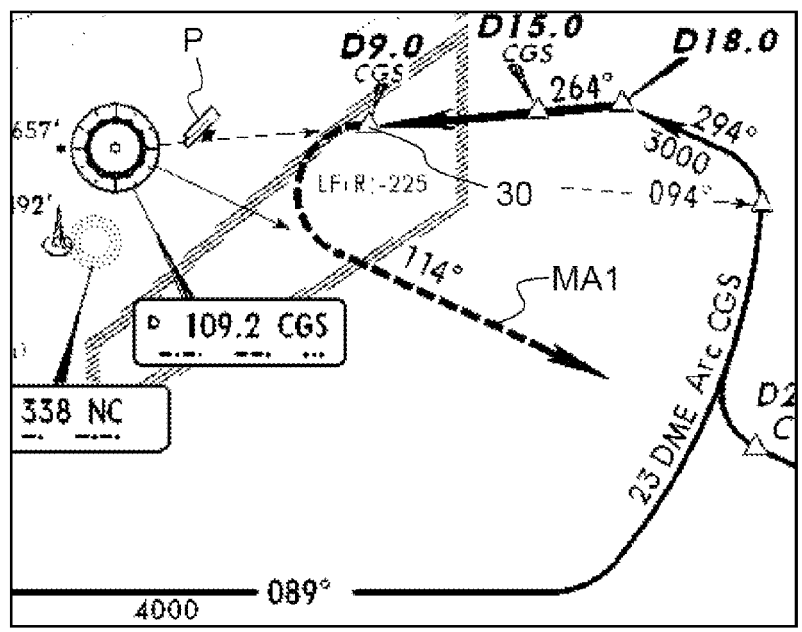
FIG. 4, already referred to, shows a map published for an instrument approach procedure.
Figure 5:
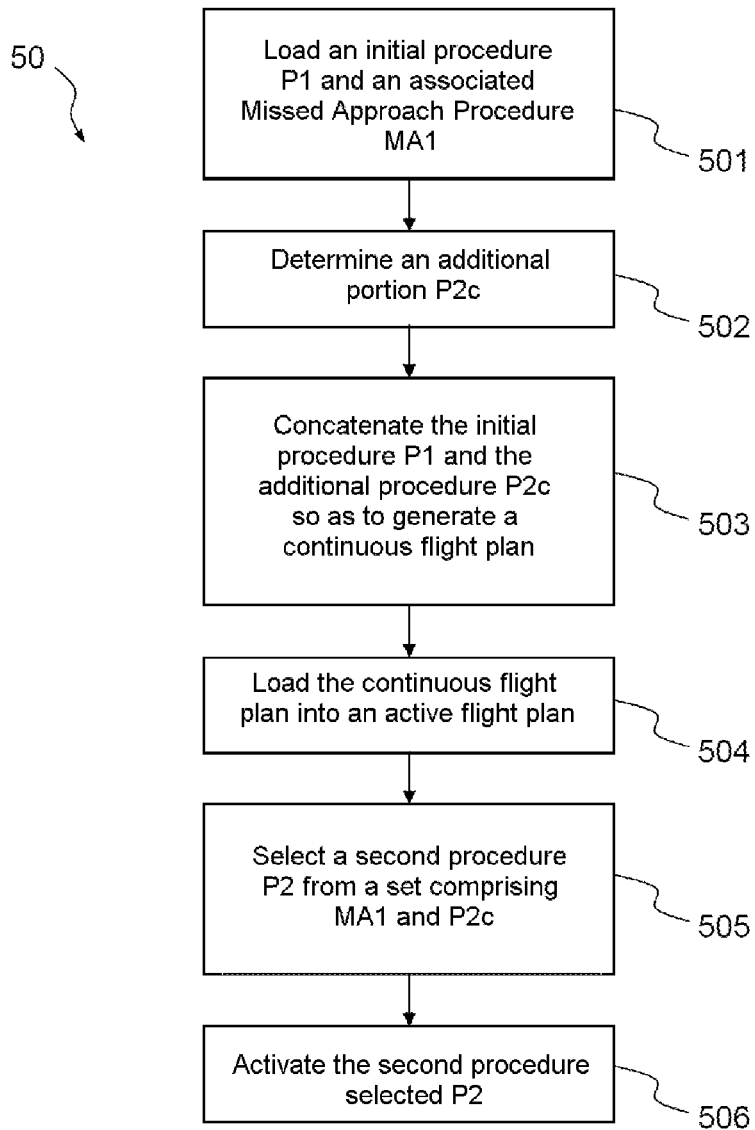
FIG. 5 describes the steps of the method according to the invention.

FIG. 5 describes the steps of the method 50 according to the invention. The method 50 calculates a flight plan of an aircraft used by a flight management system (FMS) capable of being used during a runway approach and up to the point Pa corresponding to the threshold of the runway.

The method according to the invention comprises a first step 501 of loading an initial procedure P1 ending at a first end point C1 not corresponding to the threshold Pa of the runway. The approach procedure P1 is therefore typically a published procedure previously stored in the navigation database 103 and then inserted in the flight plan de the aircraft.

As previously described in the prior art, the point C1 is a point of the MAP type and therefore an associated "Missed Approach", called the first missed approach procedure MA1, is also inserted in the flight plan de the aircraft.

Thus, the method according to the invention comprises a step 501 of loading an initial procedure P1 and its associated missed approach procedure MA1

The flight management system FMS using the method according to the invention comprises a navigation database 130 which comprises at least one stored additional procedure ending at the threshold of the runway Pa. An additional procedure is typically encoded by the air company, validated by the appropriate authorities and then also stored in the navigation database. For a same airport, there can be a plurality stored additional procedures available for the landing. As previously described in the prior art, the point Pa is also a point of the MAP type and therefore any stored additional procedure comprises an associated missed approach procedure.

In a step 502 the method according to the invention determines an additional procedure P2c, from among the at least one additional procedure stored in the navigation database 130 and an associated missed approach procedure (MA2). The determined additional procedure P2c is the one that the aircraft will follow for its landing.

According to a variant, the choice of an additional procedure P2c from among the set of available stored procedures can be carried out manually by the pilot using a man-machine interface. Each procedure is typically indexed in the database 130 by an indicator, for example a name or a code, and comprises a series of waypoints to be flown over, which allows the calculation of a trajectory by the FMS once loaded in the activated flight plan.

According to another variant, the determination of the additional procedure P2c can be carried out automatically by the FMS according to at least one predetermined first criterion. A combination of several first criteria can be used. A first example of a first criterion is to choose the procedure allowing the aircraft to fly the shortest distance between its current position and the runway in order to minimize the cost and the time of the flight. A second example of a first criterion is to carry out an indexing of preference of the additional procedures stored in the navigation database. It is also possible to combine both of these criteria according to a specific logic.

Figure 6:
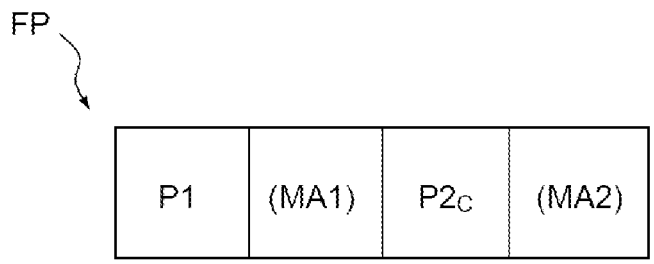
FIG. 6 describes the structure of a flight plan according to the invention.

The next step 503 concatenates the initial procedure P1 and the additional procedure P2c determined in the preceding step 502. The concatenation consists in generating a continuous flight plan FP from a flight plan comprising the following four procedures, as shown in FIG. 6: the initial procedure P1; the first missed approach procedure MA1; the additional procedure P2c; the second missed approach procedure MA2.

The concatenation step operates a continuous link between the different procedures and makes it possible to manage the localized divergence at the point C1, the last waypoint of the procedure P1. By means of the generated flight plan FP, the FMS is able to manage in a continuous manner the first leg of the flight plan comprising P1 and going as far as the MAP C1 and the second leg comprising P2 going from the point C1 to the runway. The crew can thus continuously apprehend the change from the procedure P1 to the additional procedure P2c, whilst retaining the ability to switch over to MA1 or to MA2 if needed.

By way of example, consider an initial approach procedure P1 comprising three waypoints (or legs) A1,B1,C1, a first missed approach procedure MA1 comprising three waypoints (or legs) D,E,F, an additional procedure P2c comprising four waypoints (or legs) X,Y,Z, Pa, and a second associated missed approach procedure MA2 comprising four waypoints (or legs) I,J,K,L.

According to the prior art, the procedure inserted in the flight plan of the aircraft is conventionally represented (for example on a display) by:
A1 B1 C1 DEF
The section A1 B1 C1 is the primary part of the flight plan or first section corresponding to the initial approach procedure P1, the part DEF is the associated "missed approach" part.

The concatenated flight plan FP generated by the method 50 according to the invention comprises:
A1 B1 C1 (DEF) XYZP (IJKL)
XYZP is the second flight plan part or additional section corresponding to the additional procedure P2c.

An embodiment of the concatenation step is described below.

The concatenated flight plan generated by the step 503 can be a primary, secondary, temporary or other type of flight plan.

In a step 504, the generated flight plan FP is loaded into the active flight plan, that is to say it becomes the active flight plan, when the aircraft begins the approach phase of the airport in question. The active flight plan is the one that can become, when instructed and at any time, the flight plan connected to the automatic pilot and upon which the actual guidance of the aircraft is carried out.

The next step 505 selects a second procedure P2 from a set comprising the first missed approach procedure Ma1 and the additional procedure P2c.

The selection step can be operated manually by the pilot using a man-machine interface or automatically by the FMS.

When the selection is carried out automatically by the FMS, it is operated according to a predetermined second criterion, or a combination of several second criteria as a function of parameters representative of the aerodynamic situation of the aircraft.

Examples of representative parameters and of associated criteria are described below.

In order that the method can be applied so that the pilot is provided with continuity of the active flight plan as far as the runway, the selection step 505 must be carried out at a time at which the choice between P1 and P2c is possible.

When the aircraft is actually following the procedure P1 of the flight plan (the aircraft "is flying" the flight plan) the selection is carried out at a time that is no later than the time at which the aircraft flies over the first end point C1.

When the aircraft is not following the flight plan in the initial approach procedure P1 (the aircraft is not "flying" the flight plan), and therefore it arrives in the proximity of the point C1 without necessarily flying over it, the selection is carried out not later than the time at which the aircraft is situated in the vicinity of C1.

Once the selection has been made, the method according to the invention comprises a step consisting of activating the section of the flight plan corresponding to the selected procedure. This activation takes place at the moment the aircraft passes over or in the vicinity of C1 (sequencing of the junction point C1). Thus the step 506 of the method according to the invention activates the second selected procedure P2.

In all cases when the aircraft is following the primary part of the flight plan (procedure P1) and flies over the point C1, at the moment of sequencing the junction point C1, the latter becomes the FROM waypoint (the point that the aircraft has just passed over);

when the procedure MA1 is selected, the section corresponding to the missed approach MA1 becomes the active section upon which the FMS is capable of slaving the aircraft. The point of the start of the missed approach (D in the preceding example) becomes the TO waypoint (the point towards which the aircraft flies).

when the procedure P2c is selected, the section corresponding to the additional approach procedure, called the additional section, becomes the active section upon which the FMS is capable of slaving the aircraft. The point of the start of the second section (X in the preceding example) becomes the TO waypoint (the point towards which the aircraft flies).

When the aircraft is not flying the primary part of the flight plan, the activation takes place on a criterion such that: the aircraft arrives at a distance of a few NM from C1 (typically 5 NM), or in relation to the conditions of passage through a "sequencing plane" which corresponds to the straight line bisecting the legs before and just after C1.

The selection step 505 makes it possible to choose the appropriate section for the lowest workload on the pilot (P1 or P2c) as a function either of the pilot's choice or of the meeting of one or more criteria.

The method according to the invention therefore makes it possible to choose which section of the flight plan becomes active in a situation in which a junction point with a choice exists.

An advantage of the method according to the invention consists in making it possible, when the procedure P2c has been selected and then activated and therefore the aircraft is in the process of flying the section corresponding to P2c, to switch over, in the case of a missed approach, to MA2 corresponding to the missed approach procedure associated with the section that must actually be executed (flown) by the aircraft according to regulations.

When the selected procedure is the procedure P2c, the FMS is able to calculate a trajectory taking the aircraft up to the runway and to slave the aircraft onto this trajectory if the automatic pilot is coupled to the FMS.

According to the way in which the concatenation has been completed, the guidance and sequencing rules are not the same.

Regarding the flight plan and the lateral trajectory at the junction point between the two sections, according to one implementation, the leg Arinc 424 for the point X is of the IF (Initial Fix) type, leaving the crew responsible for sequencing the segment C-X manually. An "IF" (Initial Fix) leg is a leg which indicates that the trajectory is restarted from this point. There is no calculation of trajectory between the point which precedes it and the IF. If the concatenation step generates a UIF, this generates a "hole" in the "lateral trajectory" and the crew has to manage the flight of the aircraft manually up to this point during the step. The sequencing of this IF results from this. Since manual sequencing is in progress, it is the above distance or bisector rules that are applied.

According to another implementation, the leg Arinc424 leading to the point X is of the TF (Track between two Fixes, that is to say a great circle route between C and X) type, or of the DF (Direct to a Fix, between C and X) type, or of the CF (Course to a Fix) type if it is desired to join the point X with a given route angle, or of the RF (constant radius arc) type if it is desired to join the point X by an arc of circle, or of the CI (Course to Intercept) type for intercepting a radial with a certain course, or of the VI (heading to intercept) type for intercepting a radial with a certain heading. This depends on the way in which the company and the authorities wish to define the way in which the $2^{nd}$ section must lead to the runway. In the case in which the concatenation generates this type of leg, the trajectory is continuous, with no "holes", and the FMS can thus be slaved onto it. These are therefore the conventional rules that apply for the sequencing of the points, including the point X.

An Arinc424 discontinuity can also be inserted between the point C1 and the start point of the $2^{nd}$ section. In this case, the $1^{st}$ leg following the discontinuity is of the IF type (imposed by the ARINC424 rules) and there is a return to the above IF case.

Regarding the predictions (of altitude, speed, time, wind, fuel) at the points, according to one implementation, they are not calculated on the $2^{nd}$ section as long as it is not active and they are calculated with the conventional hypotheses on the second section when it is active, starting from the real status of the aircraft.

Regarding the vertical trajectory (constituted by altitude/speed/time/fuel/wind predictions at the waypoints) which depends on the flight plan, one implementation is:

As long as the section corresponding to P2c is inactive, the predictions are calculated according to the rules of the art starting from the section corresponding to P1.

When the section corresponding to P2c is active, the predictions are calculated according to the rules of the art starting from the section corresponding to P2c. They therefore end on the runway.

In another implementation, the predictions are calculated according to the rules of the art starting from the section corresponding to P2c, whatever the active/inactive state of that section may be. The advantage is the construction of a vertical trajectory that always ends on the runway, thus giving the crew a correct view of its vertical profile which has to be locked onto in order to land. A disadvantage is that it is no longer guaranteed that the last point of the section corresponding to P1 (the point C1) is predicted with the regulation altitude and speed requirements of P1 (since it is integrated in the calculation of P2c).

In another implementation, it can be proposed to integrate the equations of the dynamics on the basis of the lateral flight plan, starting from the aircraft status predicted at the point C1, the last point of the first section, continuing the integration over the points of the second section (X,Y,Z,P) in the example).

In this implementation (in comparison with the preceding ones), the predictions are calculated according to the rules of the art starting from the section corresponding to P1. Then an additional calculation is carried out of the vertical profile between the last point of P1 and the runway, along the section corresponding to P2c.

The advantage is that a vertical profile is constructed that always ends on the runway, whilst ensuring that the point P1 is predicted with the altitude and speed values corresponding to the regulations associated with the section P1.

The method according to the invention therefore makes it possible for the aircraft to fly continuously on a single flight plan FP along a trajectory ending on the runway and benefitting from the lateral and vertical guidance of the FMS all the way to the runway.

In all cases, when a go-around is detected by the FMS the selection step consists of selecting the first missed approach procedure MA1.

Advantageously, the method 50 according to the invention comprises a step consisting of erasing the second procedure not selected in step 505, preferably once the selected procedure has been activated. The active flight plan is thus cleansed of a procedure that has become useless.

Figure 7:
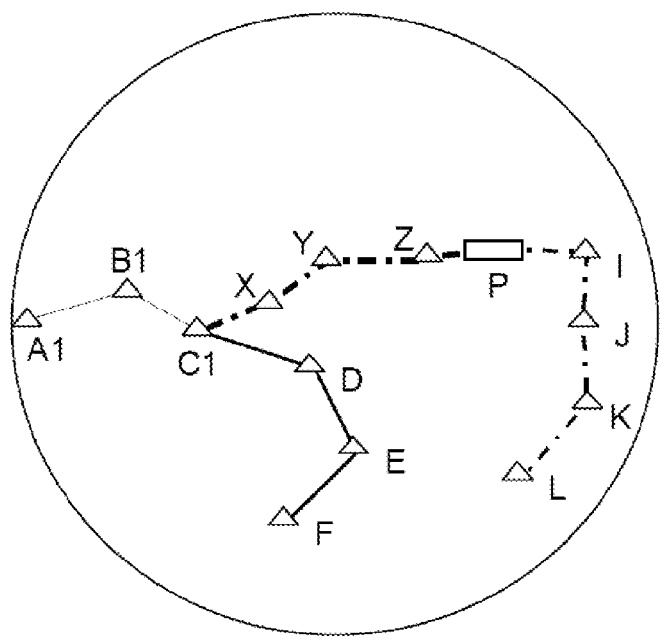
FIG. 7 shows an example display of the procedures of the flight plan according to the invention.
Figure 8:
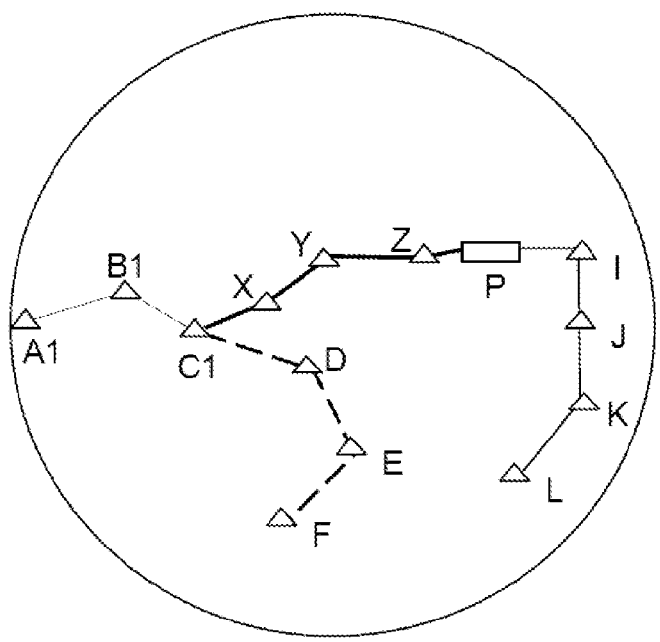
FIG. 8 shows another example display of the procedures of the flight plan according to the invention.

Advantageously, the method 50 according to the invention comprises a display step consisting of displaying, textually or graphically, the four parts of the flight plan FP generated by the method 50 (P1, MA, P2c, MA2) on a common display, as shown in FIGS. 7 and 8 taking the preceding example of waypoints again.

The pilot thus has a synthetic and complete view of the situation of the aircraft and of the different procedures available.

Advantageously, the display shows a distinction between an activated procedure (active section) and a non-activated procedure. For example, in FIG. 7 the procedure MA1 (DEF) is the activated procedure, shown in solid line, and the non-activated procedure P2c (XYZP) is shown in dotted line (as well as the associated MA2). In FIG. 8, the procedure P2c (XYZP) is the activated procedure shown in solid line and the non-activated procedure MA1 (DEF) is shown in dotted line.

Advantageously, the display shows a distinction, for example by using different colors, between standard procedures (P1, P2c) and missed approach missed approach (MA1, MA2).

Figure 9:
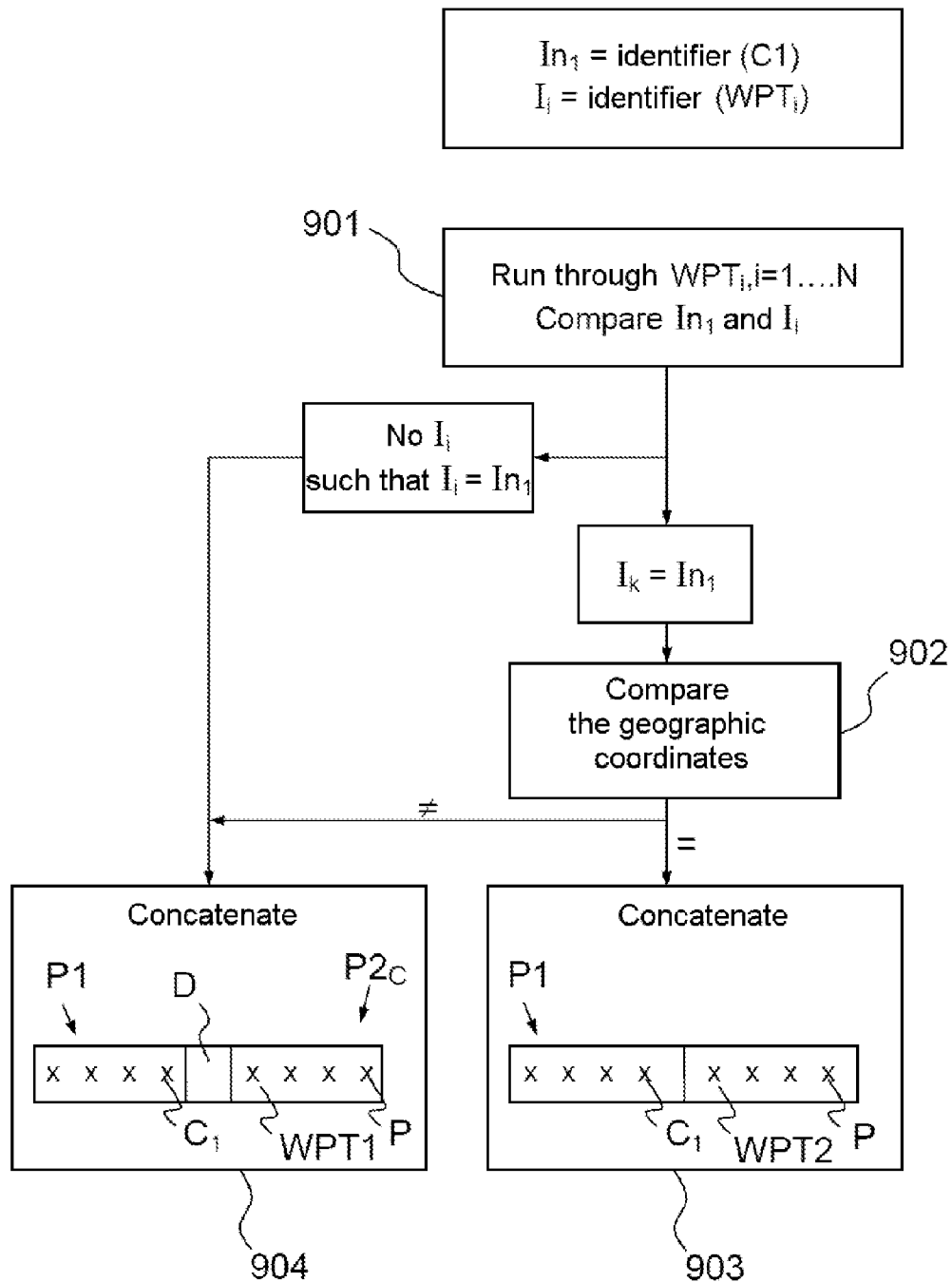
FIG. 9 shows a variant of the concatenation step of the method according to the invention.

According to a variant, the concatenation step 503 operates with the assistance of identifiers, as shown in FIG. 9.

A preliminary step consists of checking the compatibility between the procedure P1 and the selected procedure P2c, for example using a compatibility indicator.

In this variant, the first end point C1 is provided with an identifier In1, typically an alphanumeric code.

The additional procedure P2c comprises a sequenced series of n waypoints marked with an index i, WPTi (1≤i≤n), each of these points also being provided with an identifier Ii, typically an alphanumeric code.

A first sub-step 901 runs through the waypoints WPTi, and compares In1 and Ii.

When a waypoint having an indicator identical to the first identifier (I1) is identified: Ik=In1

A sub-step step 902 compares the geographic coordinates (Lat(k),Long(k)) of the identified waypoint WPTk with the geographic coordinates of the first end point ((Lat(C1), Long (C1)), When the coordinates are identical, a sub-step step 903 concatenates the initial procedure with the additional procedure starting from a start point corresponding to the identified waypoint of the sequenced series, and eliminates the waypoints situated upstream of the identified waypoint in the sequenced series.

When no waypoint comprising an indicator identical to the first indicator In1 is identified, a sub-step 904 concatenates the additional procedure P2c with the initial procedure P1 starting from a start point corresponding to the first waypoint WPT1 of the sequenced series, by inserting a lateral discontinuity D between the first end point C1 and the first point of the sequenced series WPT1.

According to a variant, a second predetermined criterion used for the selection step 505 is a function of parameters chosen from a set comprising: current heading; target heading; lateral deviation with respect to the active flight plan; altitude; energy; current position; predicted position.

A first example consists in:
selecting the first missed approach procedure MA1 if the current heading of the aircraft (or the target heading) corresponds to the heading between C1 and the second point of the procedure MA1,
selecting the additional procedure P2c if the current heading of the aircraft (or the target heading) corresponds to the heading between C1 and the second point de the procedure P2c.

It is possible to allow a tolerance of 30° in the value of the heading, for example, and a choice of continuing on P2b if the condition on the heading is met to within the threshold.

Another example consists in:
selecting MA1 if the distance that separates the aircraft on the flight plan (Crosstrack) from the leg leading from C1 to the first point of P2c is greater than a threshold S_xtk,
selecting P2c if the distance that separates aircraft on the flight plan (Crosstrack) from the leg leading from C1 to the first point of P2b is less than a threshold S_xtk.

A fixed value such as 3 NM can be taken as a fixed threshold value or a value relative to the distance remaining to travel between C1 and MA2, for example 20%.

Another example consists in:
selecting MA1 of the aircraft altitude is higher, by a threshold S_Alt, than the target altitude over C1,
selecting P2c if the aircraft altitude is lower, by a threshold S_Alt, than the target altitude over C1.

A fixed value such as 250 ft can be taken as the threshold value or a value relative to the altitude to be reduced between C1 and MA2, for example 10%, with priority given to P2c if both conditions are met.

Another example consists in:
selecting MA1 if the aircraft speed is higher, by a threshold S_spd, than the target speed over C1,
selecting P2c if the aircraft speed is lower, by a threshold S_spd, than the target speed over C1.

A fixed value such as 30 kts can be taken as a threshold value or a value relative to the speed to be reduced between C1 and MA2, 10% for example, with priority given to P2c if both conditions are met.

Another example consists in:
selecting MA1 if the aircraft energy is higher, by a threshold S_nrj, than the energy at the point C1,
selecting P2c if the aircraft energy is lower, by a threshold S_nrj, than the energy at the point C1.

The aircraft energy is the total energy Et=Ec+Ep, where $$Ec = \text{Kinetic energy} = \tfrac{1}{2}\,mV(\text{aircraft})^2$$

and $Ep = mg*Alt(\text{aircraft})$.

The energy over C1 is the total energy Et=Ec+Ep, where $$Ec = \text{Kinetic energy} = \tfrac{1}{2}\,mV\text{predicted}(C1)^2$$

and $Ep = mg*Alt\text{predicted}(C1)$.

If the speed is expressed in m/s, the altitude in m and the mass in kg, a fixed value such as 100 kJ can be taken as a fixed threshold value or a value relative to the energy to be reduced between C1 and MA2, for example 10%, with priority given to P2c if both conditions are met.

Figure 10:
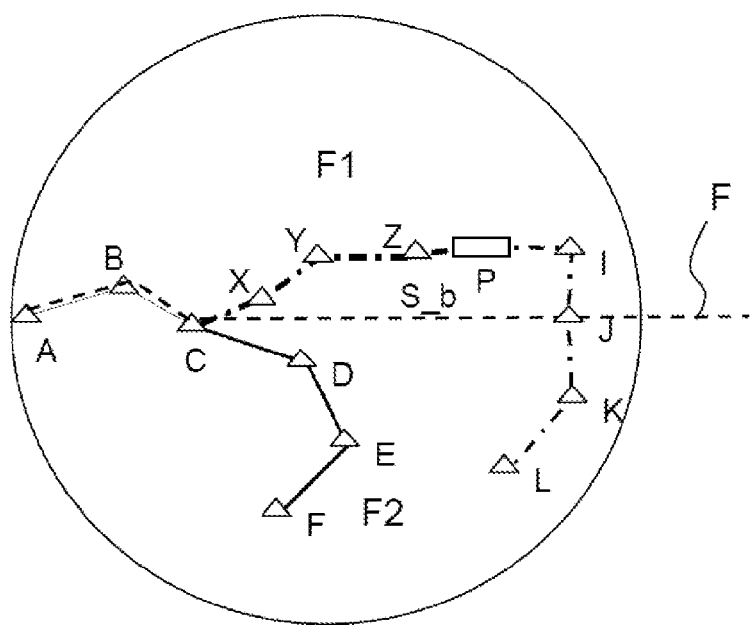
FIG. 10 shows an example of a criterion for the selection step of the method according to the invention.

Another example (shown in FIG. 10) consists in:
selecting MA1 if the aircraft is geometrically in the zone referenced F2
selecting P2c if the aircraft is geometrically in the zone referenced F1. The zones F1 and F2 can be defined as follows:

The bisecting segment S_b between the segments (C1-MA1) and (C1-P2c) is defined. The zone boundary F is defined as the segment [C1 ; S_b] and the zones F1 and F2 are as defined by:

F1 is the half-plane formed by the boundary F and not containing the first point of the segment MA1, and F2 as being the other half-plane (the one that contains the first point de MA1) as shown in FIG. 10.

Figure 11:
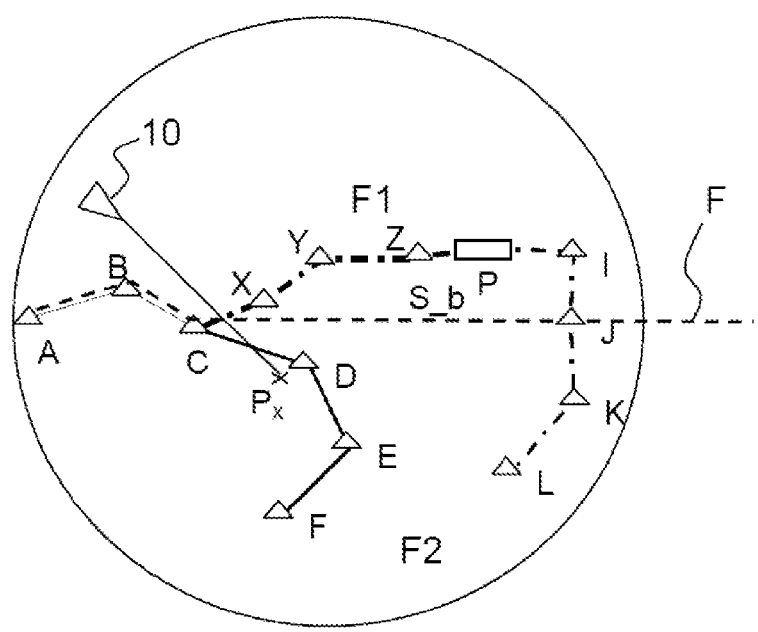
FIG. 11 shows another example of a criterion for the selection step of the method according to the invention.

Another example (shown in FIG. 11) consists in:
selecting MA1 if the target heading of the aircraft 10 chosen by the pilot at X minutes takes it geometrically into the zone F2,
selecting P2c if the target heading of the aircraft 10 chosen by the pilot at X minutes takes it geometrically into the zone F1 The point Px represents the predicted aircraft position in X minutes (for example X=1 min), taking account of the target heading chosen by the pilot.

According to another aspect of the invention, the invention relates to a device for calculating a flight plan used by a flight management system (FMS) of an aircraft in a runway approach phase, the said flight management system (FMS) comprising a navigation database comprising at least one additional stored procedure ending at the threshold of the runway and at least one associated additional missed approach procedure, the said device comprising:

a module for loading an initial procedure ending at a first end point not corresponding to a threshold of the runway and an associated first missed approach procedure, a module for determining an additional procedure from among the at least one additional procedure stored in the navigation database and an associated second missed approach procedure, a module for concatenating the initial procedure and the additional procedure in such a way as to generate a continuous concatenated flight plan comprising the initial procedure, the first missed approach procedure, the additional procedure and the second missed approach procedure, a module for loading the concatenated flight plan into an active flight plan, a module for selecting a second procedure from a set comprising the first missed approach procedure and the additional procedure, a module for activating the selected second procedure.

Advantageously the device according to the invention furthermore comprises a module for the graphical display of the initial procedure, the associated missed approach procedure, the additional procedure and the associated additional missed approach procedure on a common display.

According to another aspect, the invention relates to a computer program product, the computer program product comprising code instructions making it possible to carry out the steps of the method according to an aspect of the invention when the program is executed on a computer.

The present invention can be implemented using hardware and/or software components. It can be available as a computer program product on a medium that can be read by a computer. The medium can be electronic, magnetic, optical or electromagnetic or it can be an infra-red distribution medium. Such media are for example semiconductor memories (Random Access Memory (RAM), Read Only Memory (ROM)), tapes, diskettes or magnetic or optical disks (Compact Disk, Read Only Memory (CD-ROM), Compact Disk-Read/Write (CD-R/W and DVD).

The invention claimed is:

1. A method for calculating a flight plan used by a flight management system of an aircraft in a runway approach phase, said flight management system comprising a navigation database comprising at least one stored additional procedure ending at a threshold of the runway and at least one associated additional missed approach procedure, the method comprising the steps:

loading an initial procedure ending at a first end point not corresponding to the threshold of the runway and a first associated missed approach procedure, determining an additional procedure from among the at least one additional procedure stored in the navigation database and a second associated missed approach procedure, concatenating the initial procedure and the additional procedure in order to generate a continuous concatenated flight plan comprising the initial procedure, the first missed approach procedure, the additional procedure and the second missed approach procedure, loading the concatenated flight plan into an active flight plan, selecting a second procedure from a set comprising the first missed approach procedure and the additional procedure, and activating the selected second procedure, and graphically displaying the initial procedure, the associated missed approach procedure, the additional procedure and the associated additional missed approach procedure on a common display.

2. The method according to claim 1 wherein the step of determining an additional procedure is operated manually by the pilot using a man-machine interface.

3. The method according to claim 1 wherein the step of determining an additional procedure is operated automatically by the flight management system according to at least a first predetermined criterion.

4. The method according to claim 3, wherein the first criterion is chosen from a set comprising the shortest distance to the runway and an indexing of preference.

5. The method according to claim 1, wherein the first end point of the initial procedure is provided with a first identifier, wherein the additional procedure comprises a sequenced series of waypoints each having an identifier, and wherein the concatenation step comprises the sub-steps of:

running through the waypoints and comparing the indicator of the current waypoint with the first identifier, when a waypoint having an indicator identical to the first identifier is identified:

comparing the geographic coordinates of the identified waypoint with the geographic coordinates of the first end point, when the coordinates are identical, concatenating the initial procedure with the additional procedure from a start point corresponding to the identified waypoint of the sequenced series, eliminating the waypoints situated upstream of the identified waypoint in the sequenced series, when no waypoint comprising an indicator identical to the first indicator is identified:

concatenating the additional procedure with the initial procedure starting from a start point corresponding to the first waypoint of the sequenced series, by inserting a lateral discontinuity between the first end point and the first point of the sequenced series.

6. The method according to claim 1, wherein the selection step is operated manually by a pilot using a man-machine interface.

7. The method according to claim 1, wherein the selection step is operated automatically by the flight management system according to at least one second predetermined criterion that is a function of parameters representative of the aerodynamic situation of the aircraft.

8. The method according to claim 7, wherein the parameters are chosen from a set comprising: current heading; target heading; lateral deviation with respect to the active flight plan; altitude; energy; current position; predicted position.

9. The method according to claim 1, further comprising a step consisting of eliminating the second non-selected procedure.

10. The method according to claim 1, wherein the display shows a differentiation between activated and non-activated procedures.

11. A device for calculating a flight plan used by a flight management system of an aircraft in a runway approach phase, said flight management system comprising a navigation database comprising at least one additional stored procedure ending at a threshold of the runway and at least one associated additional missed approach procedure, the device being configured to:

load an initial procedure ending at a first end point not corresponding to a threshold of the runway and an associated first missed approach procedure, determine an additional procedure from among the at least one additional procedure stored in the navigation database and an associated second missed approach procedure, concatenate the initial procedure and the additional procedure in such a way as to generate a continuous concatenated flight plan comprising the initial procedure, the first missed approach procedure, the additional procedure and the second missed approach procedure, load the concatenated flight plan into an active flight plan, select a second procedure from a set comprising the first missed approach procedure and the additional procedure, activate the selected second procedure, and a display configured to graphically display the initial procedure, the associated missed approach procedure, the additional procedure and the associated additional missed approach procedure.

12. The device according to claim 11, wherein the device is further configured to generate a graphical display of the initial procedure, the associated missed approach procedure, the additional procedure and the associated additional missed approach procedure on the display.

13. A tangible non-transitory computer program product, said tangible non-transitory computer program product comprising code instructions configured to be executed on a computer for calculating a flight plan used the computer for an aircraft in a runway approach phase, said computer comprising a navigation database comprising at least one stored additional procedure ending at a threshold of the runway and at least one associated additional missed approach procedure, said tangible non-transitory computer program product comprising:

instructions for loading an initial procedure ending at a first end point not corresponding to the threshold of the runway and a first associated missed approach procedure, instructions for determining an additional procedure from among the at least one additional procedure stored in the navigation database and a second associated missed approach procedure, instructions for concatenating the initial procedure and the additional procedure in order to generate a continuous concatenated flight plan comprising the initial procedure, the first missed approach procedure, the additional procedure and the second missed approach procedure, instructions for loading the concatenated flight plan into an active flight plan, instructions for selecting a second procedure from a set comprising the first missed approach procedure and the additional procedure, and instructions for activating the selected second procedure, and instructions for graphically displaying the initial procedure, the associated missed approach procedure, the additional procedure and the associated additional missed approach procedure on a common display.

\* \* \* \* \*